US012373898B2

(12) United States Patent
Potter et al.

(10) Patent No.: US 12,373,898 B2
(45) Date of Patent: Jul. 29, 2025

(54) DISPLAY TOOL

(71) Applicant: The Prudential Insurance Company of America, Newark, NJ (US)

(72) Inventors: Christopher Brian Potter, Mooresville, NC (US); Brian James Perra, Andover, MN (US); Lisa Marie Wark, Zimmerman, MN (US); Jeff Lee Dennie, Champlin, MN (US); David Nothnagel, Flemington, NJ (US); Ava Posner, Rutherford, NJ (US); Linda Julian, Roseland, NJ (US)

(73) Assignee: The Prudential Insurance Company of America, Newark, NJ (US)

( * ) Notice: Subject to any disclaimer, the term of this patent is extended or adjusted under 35 U.S.C. 154(b) by 0 days.

(21) Appl. No.: 17/314,837

(22) Filed: May 7, 2021

(65) Prior Publication Data

US 2022/0358601 A1     Nov. 10, 2022

(51) Int. Cl.
*G06Q 40/12*      (2023.01)
*G06F 3/0482*     (2013.01)
*G06F 3/04855*    (2022.01)
*G06Q 40/06*      (2012.01)
*G06T 11/20*      (2006.01)

(52) U.S. Cl.
CPC .......... *G06Q 40/12* (2013.12); *G06F 3/0482* (2013.01); *G06F 3/04855* (2013.01); *G06Q 40/06* (2013.01); *G06T 11/206* (2013.01)

(58) Field of Classification Search
CPC ...... G06Q 40/12; G06Q 40/06; G06F 3/0482; G06F 3/04855; G06F 3/0481; G06T 11/206; G06T 2200/24; G06T 11/60
See application file for complete search history.

(56) References Cited

U.S. PATENT DOCUMENTS

| | | | |
|---|---|---|---|
| 7,383,218 B1 * | 6/2008 | Oros | G06Q 40/06 705/36 R |
| 9,665,908 B1 * | 5/2017 | Kunz | G06Q 40/06 |
| 10,896,190 B1 | 1/2021 | Potter et al. | |
| 11,328,359 B1 * | 5/2022 | Dahm | G06F 3/04847 |
| 2006/0020531 A1 * | 1/2006 | Veeneman | G06Q 40/00 705/35 |
| 2007/0282759 A1 * | 12/2007 | Devries | G06Q 40/06 705/36 R |

(Continued)

*Primary Examiner* — Kieu D Vu
*Assistant Examiner* — Blaine T Basom
(74) *Attorney, Agent, or Firm* — Baker Botts L.L.P.

(57) ABSTRACT

An apparatus includes a display, memory, and processor. The memory stores information associated with subaccounts of an account. The processor receives a request to display the information. The processor displays a table that includes the names of the subaccounts, premium payment allocation amounts assigned to the subaccounts, and values of the subaccounts. The processor displays a graphical illustration associated with the account, that includes a first set of sections associated with the allocation amounts and/or a second set of sections associated with the values. Each section defines an area on the display that is proportional to the corresponding allocation amount or value. The processor further receives an indication associated with one of the subaccounts. In response, the processor emphasizes the row of the table and at least one of the sections assigned to the subaccount.

16 Claims, 7 Drawing Sheets

(56) References Cited

U.S. PATENT DOCUMENTS

| | | | |
|---|---|---|---|
| 2008/0034329 A1* | 2/2008 | Posner | H04L 67/306 |
| | | | 715/711 |
| 2010/0067029 A1* | 3/2010 | Marshall | G06F 40/106 |
| | | | 358/1.9 |
| 2010/0100469 A1* | 4/2010 | Buchanan | G06Q 40/02 |
| | | | 705/35 |
| 2010/0253686 A1* | 10/2010 | Alsbury | G06T 11/206 |
| | | | 345/440 |
| 2010/0299160 A1* | 11/2010 | Roscoe | G06Q 40/06 |
| | | | 705/37 |
| 2011/0115795 A1* | 5/2011 | Koch | G06T 11/20 |
| | | | 345/440 |
| 2012/0054121 A1* | 3/2012 | Fiala | G06Q 40/06 |
| | | | 705/36 R |
| 2016/0364800 A1* | 12/2016 | Dennelly | G06Q 40/06 |
| 2017/0053425 A1* | 2/2017 | Lee | G06T 11/206 |
| 2020/0211242 A1* | 7/2020 | Reiter | G06T 11/206 |
| 2020/0349648 A1* | 11/2020 | Cosmano | G06Q 40/06 |
| 2021/0034693 A1* | 2/2021 | Semerad | G06F 16/986 |
| 2021/0097066 A1 | 4/2021 | Potter et al. | |
| 2021/0133188 A1 | 5/2021 | Potter et al. | |

* cited by examiner

FIG. 2

Contract Fund & Premium Allocation

As of 1/14/2021

| Name | Code | Premium Allocation | Value |
|---|---|---|---|
| AAA Small Cap Value | AAA | 15.0% | $905.50 |
| AB Mid Cap Value | ABM | 20.0% | $190.70 |
| ABC Fund | ABC | 20.0% | $1,086.44 |
| BCD Bond Series | BCD | 25.0% | $979.04 |

Quarterly Average Annual Total Returns As of 12/31/2020

| 1 Year % | 5 Years % | 10 Years / Since Inception % |
|---|---|---|
| 13.86% | 10.02% | 6.57% |
| 1.11% | 9.24% | 10.23% |
| 2.23% | 7.08% | 7.98% |
| 0.07% | 0.22% | 1.09% |

ABC Fund Allocation: 20.0% Value: $1,086.44

BCD Bond Series
AAA Small Cap Value
AB Mid Cap Value
XYZ Fund

● Contract Fund Value
▓ Premium Allocation

Auto Rebalancing
Funds
50.0% - ABC Fund
50.0% - BCD Bond Series

Dollar Cost Averaging
Allocated Charges

Understanding the Market
Newsroom
Strategic Investment Research Group

All Available Subaccounts
AAA Portfolio (AAA)
ABC Portfolio (ABC)
AXX Asset Allocation Portfolio (AXX)
BCD Growth Portfolio (BCD)
BXX Growth Fund (BXX)
CDE Balanced Portfolio (CDE)
DDD Fund (DDD)
DEF Asset Portfolio (DEF)

View Forms

Return

FIG. 4B

DISPLAY TOOL

TECHNICAL FIELD

This disclosure relates generally to an improved graphical user interface.

BACKGROUND

In a variety of industries, it is standard practice for companies to provide information to their consumers and producers (agents who sell directly to consumers) in the form of multi-page documents. For example, customers commonly receive information about accounts, opportunities, and policies through such documents.

SUMMARY

In a variety of industries, it is standard practice for companies to provide information to their consumers and producers (agents who sell directly to consumers) in the form of multi-page documents. For example, consumers commonly receive information about accounts, opportunities, and policies through such documents. With the explosion of the Internet and the use of personal computers, companies have also begun to provide consumers and producers electronic access to the information contained in such documents, by developing graphical user interfaces through which the consumers and producers can view such information. However, such graphical user interfaces tend to be quite complex, given the large volume of data to which they provide access. Given the limited display area of a typical computer monitor (or in some cases, a smaller device such as a mobile phone), such graphical user interfaces are generally unable to present all the data contained in traditional multi-page documents to a user on a single display page. As a result, typical graphical user interfaces frequently contain a large number of menus and linked pages that users may find difficult to navigate through. For example, if accessing a particular piece of information first requires a user to click through two menus and six links, the user may simply avoid accessing this information.

As discussed above, such issues exist in a variety of industries in which graphical user interfaces are used to present information traditionally contained in multi-page documents to producers and/or consumers. As a specific example, in the life insurance industry, companies traditionally provide information about their insurance policies to consumers and producers in the form of illustrations. For example, an "as sold" illustration provides information reflecting the original intent of the consumer in purchasing the policy, a "baseline" illustration may provide information reflecting the original intent of the customer, or the current intent of the consumer, and an "in force" illustration provides information regarding the likely future performance of the policy over time, given the policy's actual, historic performance. This performance may depend on the performance of one or more investment funds into which the premium payments associated with the policy have been invested. Insurance policy illustrations are typically 20 to 30 pages in length and are filled with a large quantity of numbers and disclosures. Currently available graphical user interfaces are unable to display this information in an easy to understand format, making it difficult for producers to actively understand and monitor the performance of the policies they have sold to consumers. This can lead to a variety of issues. For example, a producer may be unaware that a policy owner has initiated large withdrawals or loans against his/her policy that put the policy in danger of lapsing. Without such knowledge, the producer may be unable to counsel the policy owner about the effect of such actions in time to prevent the lapse. As another example, a producer may expend significant resources (e.g., computational and/or time-related) to keep the consumer updated about the performance of his/her policy.

This disclosure contemplates a display tool that addresses one or more of the above issues. This tool provides an improved graphical user interface for use in a variety of industries. The graphical user interface is designed to enable users to efficiently access available information. In particular, certain embodiments enable users to access any of the information accessible through the interface from the main page of the interface (either by viewing the information directly on the main page of the graphical user interface, by following one of a set of links displayed on the main page to the particular information, or by expanding an additional section of the interface which may be displayed on the main page).

While this disclosure contemplates the use of the display tool in any industry, for ease of explanation and understanding but not by way of limitation, this disclosure describes the tool as implemented for the life insurance industry. Such an implementation simplifies the process by which life insurance policy producers monitor the policies they have sold; rather than requiring producers to search through multiple complex documents stored at a variety of locations, accessible only by clicking through a series of links, the display tool provides a producer with any information the producer may want to know about a given policy directly from the main page of the graphical user interface for that particular policy. For example, in certain embodiments, the main page of the graphical user interface displays information about the historical and expected future performance of the life insurance policy over time, in an intuitive graphical format. To enable a producer of the policy to gain a deeper understanding into the performance of the policy, certain embodiments of the tool display a link on the main page of the graphical user interface through which the producer may access detailed information about the investments associated with the life insurance policy. In response to a producer selecting this link, the tool accesses information related to the investments and displays this information in easy to understand, graphical and/or tabular formats. In this manner, certain embodiments of the tool provide an improved user interface that simplifies and streamlines the navigation process relative to conventional interfaces. Certain embodiments of the display tool are described below.

According to an embodiment, an apparatus includes a display, a memory, and a hardware processor communicatively coupled to the memory and the display. The memory stores information associated with an account that includes a set of subaccounts. The information includes a set of allocation amounts and a set of values. Each allocation amount of the set of allocation amounts is assigned to a subaccount of the set of subaccounts and indicates a percentage of a premium payment allocated to the subaccount. Each value of the set of values is associated with a subaccount of the set of subaccounts and indicates an amount invested in an investment fund associated with the subaccount. The hardware processor receives a request to display the information associated with the account. The processor also displays, on a first region of the display, a table comprising one or more rows. Each row is assigned to a subaccount of the set of subaccounts and includes a name assigned to the subaccount, the allocation amount assigned to the subaccount, and the value of the subaccount. The processor additionally displays on a second region of the display a graphical illustration associated with the account. The graphical illustration includes at least one of a first set of sections or a second set of sections. Each section of the first set of sections corresponds to an allocation amount of the set of allocation amounts and defines an area on the display that is proportional to the corresponding allocation amount. Each section of the second set of sections corresponds to a value of the set of values and defines an area on the display that is proportional to the corresponding value. The processor further receives an indication associated with a first subaccount of the set of subaccounts. In response to receiving the indication, the processor emphasizes the row of the table assigned to the first subaccount. The processor also emphasizes at least one of the section of the first set of sections corresponding to the allocation amount assigned to the first subaccount, wherein the graphical illustration includes the first set of sections, or the section of the second set of sections corresponding to the value of the first subaccount, wherein the graphical illustration includes the second set of sections.

According to another embodiment, a method includes receiving a request to display information associated with an account that includes a set of subaccounts. The information includes a set of allocation amounts and a set of values. Each allocation amount of the set of allocation amounts is assigned to a subaccount of the set of subaccounts and indicates a percentage of a premium payment allocated to the subaccount. Each value of the set of values is associated with a subaccount of the set of subaccounts and indicates an amount invested in an investment fund associated with the subaccount. The method also includes displaying on a first region of a display a table that includes one or more rows. Each row is assigned to a subaccount of the set of subaccounts and includes a name assigned to the subaccount, the allocation amount assigned to the subaccount, and the value of the subaccount. The method additionally includes displaying on a second region of the display a graphical illustration associated with the account. The graphical illustration includes at least one of a first set of sections or a second set of sections. Each section of the first set of sections corresponds to an allocation amount of the set of allocation amounts and defines an area on the display that is proportional to the corresponding allocation amount. Each section of the second set of sections corresponds to a value of the set of values and defines an area on the display that is proportional to the corresponding value. The method further includes receiving an indication associated with a first subaccount of the set of subaccounts. In response to receiving the indication, the method includes emphasizing the row of the table assigned to the first subaccount. The method also includes emphasizing at least one of the section of the first set of sections corresponding to the allocation amount assigned to the first subaccount, wherein the graphical illustration comprises the first set of sections, or the section of the second set of sections corresponding to the value of the first subaccount, wherein the graphical illustration comprises the second set of sections.

Certain embodiments provide one or more technical advantages. For example, an embodiment conserves computational resources by enabling policy producers to access relevant information about an insurance policy they have sold using a single graphical user interface, rather than having to search through multiple documents and pages, which may be stored across multiple systems. As another example, an embodiment provides graphical representations of investment performance that are easier to understand than the tables and lists of numbers that are traditionally used in the industry. In particular, certain embodiments link sections of the graphical illustration to corresponding data displayed in tabular form, such that when a user interacts with the tabular data, the system automatically highlights the relevant sections of the graphical illustration, and vice versa. As a further example, certain embodiments of the graphical user interface include one or more floating buttons through which a user may interact in order to access certain information. Because these buttons are anchored to a position on the user's browser, rather than a position within the graphical user interface, in certain embodiments, the use of these buttons reduces the time expended by the user in navigating to the buttons, thereby conserving computational resources. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIG. 2 presents an example of a traditional policy illustration;

FIGS. 4A through 4C present examples of a page of the graphical user interface generated by the system of FIG. 1 that provides graphical and tabular illustrations of the performance of one or more investments belonging to a policy.

DETAILED DESCRIPTION

Embodiments of the present disclosure and its advantages are best understood by referring to FIGS. 1 through 5 of the drawings, like numerals being used for like and corresponding parts of the various drawings.

I. System Overview

Figure 1:
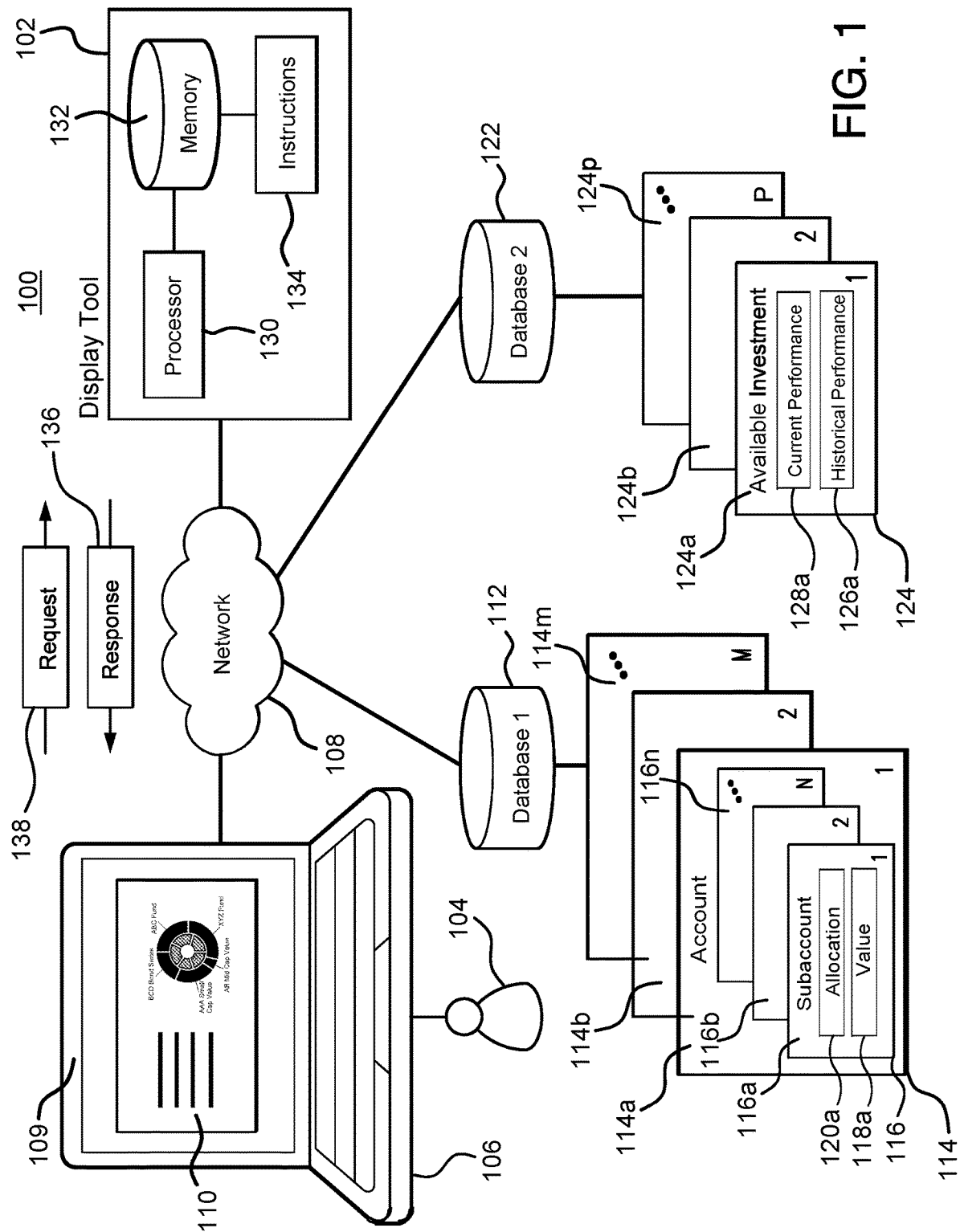
FIG. 1 illustrates an example system.

FIG. 1 illustrates an example system 100. As seen in FIG. 1, system 100 includes user(s) 104, device(s) 106, network 108, first database 112, second database 122, and display tool 102. Generally, display tool 102 accesses databases 112 and/or 122 to obtain information associated with an investment account 114 associated with a life insurance policy. Display tool 102 then presents this information to user 104 in the form of a graphical user interface 110 displayed on display 109 of device 106. Details about the type of information displayed by graphical user interface 110 and the features offered by graphical user interface 110 are presented below and in the discussion of FIGS. 3 through 5.

Device 106 is used by user 104 to display graphical user interface 110 and to communicate with display tool 102. For example, user 104 may use device 106 to receive information 136 from display tool 102, and to display this information on graphical user interface 110. User 104 may also interact with graphical user interface 110 in order to transmit information 138 to display tool 102. For example, user 104 may interact with one or more buttons and/or interactive features of graphical user interface 110 to communicate information 138 to display tool 102. As a specific example, user 104 may select a form from a list of available forms displayed in graphical user interface 110, thereby instructing device 106 to transmit a request 138 to display tool 102 for the selected form. In response to receiving such request 138, display tool 102 may transmit the selected form to device 106, as communication 136. In response to receiving the form in communication 136, device 106 may then present the form to user 104, on display 109.

Display 109 is a screen used by device 106 to display information 136 received from display tool 102. Device 106 displays this information on display 109 in the form of graphical user interface 110. In certain embodiments, display 109 is a standard display used in a laptop computer. In some embodiments, display 109 is an external display device connected to a laptop or desktop computer. In further embodiments, display 109 is a standard touch-screen liquid crystal display found in a typical smartphone or tablet. In some embodiments, a user may interact with the display in order to access zoom functionality associated with the information displayed on the display. For example, where the information received by device 106 is information associated with a webpage that is then displayed on display 109, user 104 may interact with display 109 in order to zoom in on portions of the webpage, such as a table, a graphical illustration, and/or any other information displayed on the webpage. User 104 may interact with display 109 in order to access a zoom function in any suitable manner. For example, in certain embodiments, user 104 may zoom in on a region of information displayed on display 109 by: (1) selecting a button displayed on display 109, (2) clicking on the region, (3) performing a gesture on a touch-screen display 109, and/or (4) performing any other suitable interaction or combination of interactions with display 109.

Device 106 includes any appropriate device for (1) communicating with components of system 100 over network 108, and (2) displaying graphical user interface 110 on display 109. For example, device 106 may be a smart phone, a tablet, a computer, a laptop, an automated assistant, an IoT device, and/or any other suitable device. In addition to a display 109 (e.g., an integrated display 109 of device 106, or an external display 109 connected to device 106), device 106 may include any other appropriate user interface, such as a microphone, a keypad, or any other suitable terminal equipment controllable by user 104 to operate and/or otherwise interact with device 106. In some embodiments, an application executed by a processor of device 106 may perform the functions described herein.

In certain embodiments, and as illustrated in FIG. 1, display tool 102 is a separate device (or set of devices) from device 106. For example, in certain embodiments, display tool 102 may include a server that hosts a website, which is accessible to device 106 over network 108. In such embodiments, graphical user interface 110 may be accessible through such website. For example, user 104 may use a browser installed on device 106 to navigate to the website, which may then present graphical user interface 110 to user 104. As a specific example, in certain embodiments, user 104 may access graphical user interface 110 by logging into the website.

In some embodiment, device 106 may include display tool 102. For example, processor 130 of display tool 102 may correspond to one or more processors of device 106, and memory 132 of display tool 102 may correspond to memory associated with device 106. In such embodiments, user 104 may cause display tool 102 to display graphical user interface 110 on display 109, by executing a program (e.g., instructions 134) installed in device 106. In some embodiments (e.g., where device 106 is a mobile phone or tablet), graphical user interface 110 may be associated with an application installed on device 106 and accessible through an icon displayed on display 109.

Network 108 facilitates communication between and amongst the various components of system 100. This disclosure contemplates network 108 being any suitable network operable to facilitate communication between the components of system 100. Network 108 may include any interconnecting system capable of transmitting audio, video, signals, data, messages, or any combination of the preceding. Network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

First database 112 stores information about a group of accounts 114. Each account 114a through 114m holds premium payments, and/or other funds contributed to the account by the consumer to whom the account belongs (the account owner). These payments/contributions may be invested in one or more investment funds 124. In certain embodiments, each account 114a through 114m is associated with a life insurance policy that a producer has sold to a consumer. In certain embodiments, each account 114 includes one or more subaccounts 116. For example, as illustrated in FIG. 1, account 114a includes subaccounts 116a through 116n. Each subaccount 116a through 116n is associated with an investment fund 124a through 124p. For example, first subaccount 116a may be associated with investment fund 124a. Premium payments and/or other funds contributed to a given account 114 (e.g., account 114a) are allocated amongst the various subaccounts 116 (e.g., subaccounts 116a through 116n) associated with the account, based on allocation amounts 120. For example, allocation amount 120a may indicate that 20% of the premium payments/funds contributed to account 114a are to be allocated to subaccount 116a. At any instant in time, each subaccount 116 (e.g., 116a) has a given value 118 (e.g., value 118a). Value 118 represents the current monetary value of the subaccount, and depends on the historical performance of the investment fund 124 into which premium payments/contributions allocated to the subaccount 116 have been invested. Accordingly, value 118 of subaccount 116 may be higher or lower than the total value of all premium payments/contributions allocated to subaccount 116.

Second database 122 stores information about a set of investment funds 124 into which an owner of an account 114 may choose to invest. Investment funds 124a through 124p correspond to any suitable financial instrument/vehicle into which money may be invested. For example, investment funds 124 may include mutual funds, exchange-traded funds, hedge funds, money market funds, fixed income funds, equity funds, balanced funds, index funds, specialty funds, fund-of-funds, and/or any other suitable mutual funds. For each investment fund 124a through 124p, second database 122 stores information associated with the current performance 128 of the fund, as well as information associated with the historical performance 126 of the fund. Second database 122 may store any suitable quantity and/or type of historical performance information 126. For example, second database 122 may store historical information about the quarterly returns of the fund, the semi-annual returns of the fund, the annual returns of the fund, and/or the returns of the fund over any other suitable period of time. In some embodiments, second database 122 may store information about such returns averaged over time. For example, in certain embodiments, second database 122 may store average quarterly returns for the fund over the past year, the past five years, the past ten years, and/or since inception of the fund.

First database 112 and second database 122 may be any suitable information storage locations. For example, in certain embodiments, one or both of first database 112 and second database 122 is a relational database, a non-relational database, a distributed database, a cloud database, a file server, a blob storage system, or any other suitable storage location. The information stored in first database 112 and/or second database 122 may be updated in any suitable manner. For example, in certain embodiments, display tool 102 updates the information stored in first database 112 and/or second database 122. For instance, user 104 may use display tool 102 (e.g., through interactions with graphical user interface 110) to update allocation amounts 120 for subaccounts 116*a* through 116*n* of an account 114, and/or adjust the value 118 of one or more subaccounts 116 by, for example, withdrawing funds from account 114, and/or transferring funds from a first subaccount (e.g., subaccount 116*a*) to a second subaccount (e.g., subaccount 116*b*). In some embodiments, the information stored in first database 112 and/or second database 120 may be updated by a separate system/tool. For example, in certain embodiments, a separate system may update the investment performance information 126/128 stored in second database 122 for investment funds 124 at regular and/or irregular intervals, based on the market performance of the investment funds. While illustrated in FIG. 1 as being separate storage locations, in certain embodiments, first database 112 and second database 122 may correspond to the same storage location.

As seen in FIG. 1, display tool 102 includes a processor 130 and a memory 132. This disclosure contemplates processor 130 and memory 132 being configured to perform any of the functions of display tool 102 described herein. Generally, display tool 102: (1) receives a request 138 for information associated with an account 114; (2) accesses first database 112 and/or second database 122 to obtain the requested information; (3) transmits the information to device 106 as response 136, (4) causes device 106 to display a GUI 110 on display 109 that displays the requested information, and (5) causes device 106 to adjust the content of GUI 110 in response to user interactions with the GUI. The manner by which display tool 102 performs these functions is described in further detail below, in the discussion of FIGS. 3 through 5.

Processor 130 is any electronic circuitry, including, but not limited to microprocessors, application specific integrated circuits (ASIC), application specific instruction set processor (ASIP), and/or state machines, that communicatively couples to memory 132 and controls the operation of display tool 102. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of display tool 102 by processing information received from network 108, user 104, and memory 132. Processor 130 may be a programmable logic device, a microcontroller, a microprocessor, any suitable processing device, or any suitable combination of the preceding. Processor 130 is not limited to a single processing device and may encompass multiple processing devices. In some embodiments, processor 130 is a processor of device 106.

Memory 132 may store, either permanently or temporarily, data, operational software 134, or other information for processor 130. Memory 132 may include any one or a combination of volatile or non-volatile local or remote devices suitable for storing information. For example, memory 132 may include random access memory (RAM), read only memory (ROM), magnetic storage devices, optical storage devices, or any other suitable information storage device or a combination of these devices. The software 134 represents any suitable set of instructions, logic, or code embodied in a computer-readable storage medium. For example, the software 134 may be embodied in memory 132, a disk, a CD, or a flash drive. In particular embodiments, the software 134 may include an application executable by processor 130 to perform one or more of the functions described herein.

Modifications, additions, or omissions may be made to the systems described herein without departing from the scope of the invention. For example, system 100 may include any number of users 104, devices 106, networks 108, first databases 112, second databases 122, processors 130, memories 134, requests 138, and/or responses 136. The components may be integrated or separated. Moreover, the operations may be performed by more, fewer, or other components. Additionally, the operations may be performed using any suitable logic comprising software, hardware, and/or other logic.

II. Comparison to Conventional Systems

In certain embodiments, display tool 102 provides policy producers with easily accessible information about the life insurance policies they manage, by presenting this information in the form of an unconventional graphical user interface 110 on display 109. Graphical user interface 110 displays graphical representations of information associated with these policies, which, in certain embodiments, enables policy producers to efficiently gain an overall understanding of a policy. In particular, such graphical representations are easier to understand than the tables and lists of numbers that typically make up the policy illustrations that are traditionally presented to producers in the life insurance industry.

Figure 2:
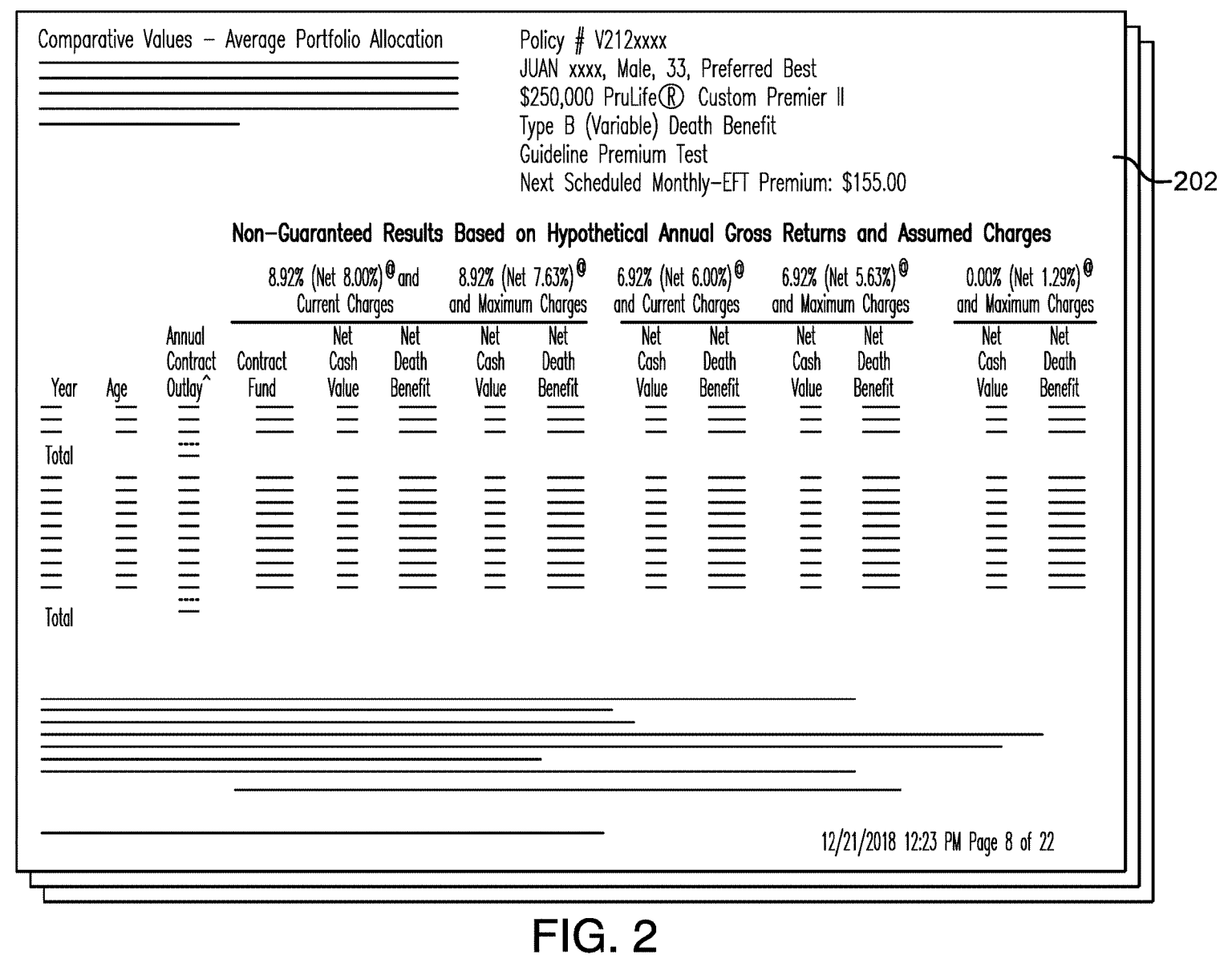
Figure 3:
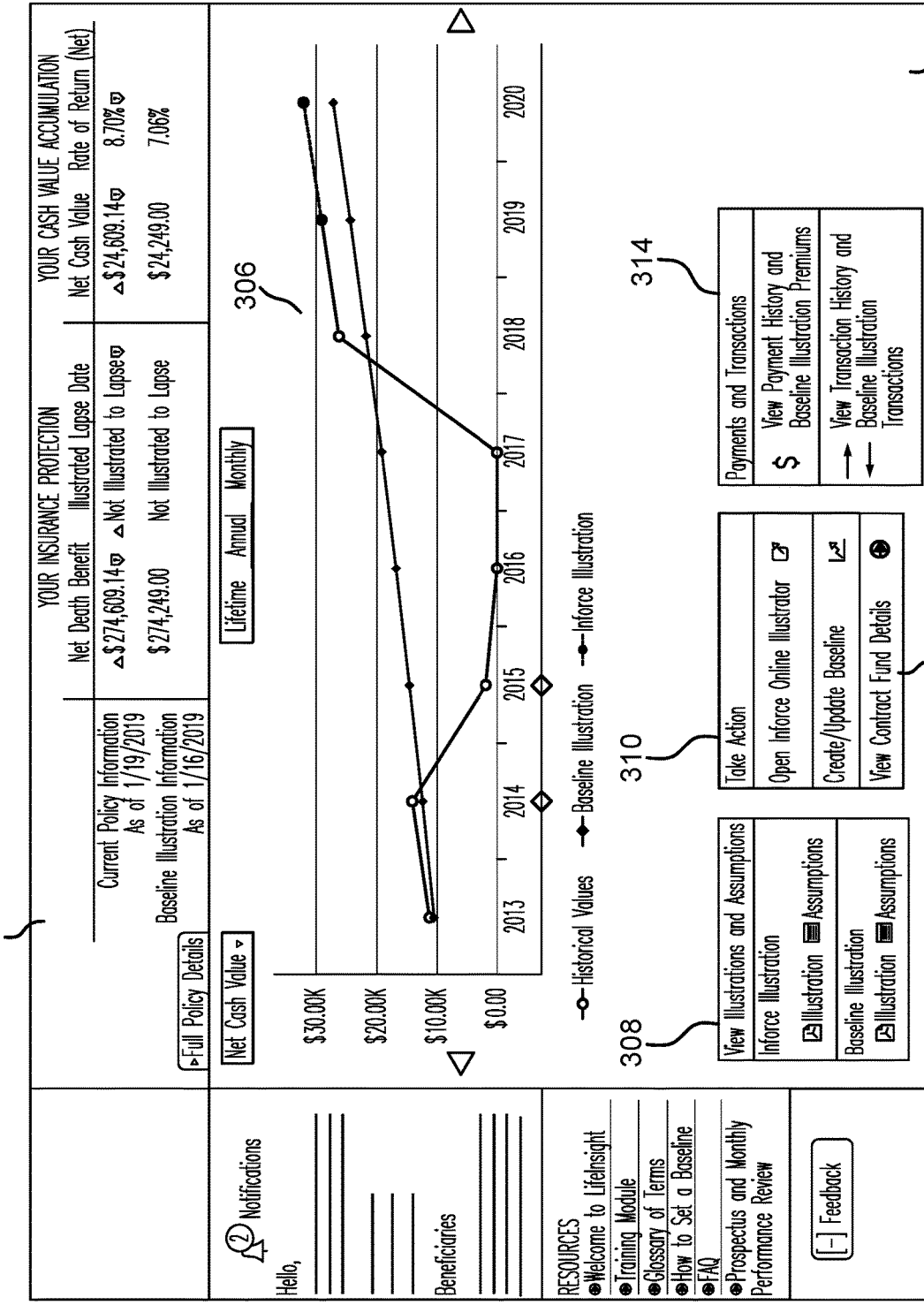
FIG. 3 presents an example of the main page of the graphical user interface generated by the system of FIG. 1, which displays information associated with a policy.

FIGS. 2 and 3 present a comparison between a traditional life insurance policy illustration and an example main page 110*a* of graphical user interface 110 generated by display tool 102 of FIG. 1. As can be seen in FIG. 2, life insurance policy information is typically presented to producers through multi-page life insurance policy illustrations 202, which contain various numbers and tables. In certain embodiments, producers may find it difficult to locate information within these documents, and/or to fully understand the information that is included within the documents. In contrast, display tool 102 may present information associated with a life insurance policy to a policy producer 104 in an interactive and easy to understand manner, through the use of main page 110*a* of graphical user interface 110. In certain embodiments, a policy producer may spend considerably more time analyzing the data presented in document 202, illustrated in FIG. 2, to obtain the basic understanding of the behavior of a life insurance policy that he/she could obtain simply by glancing at the data presented in FIG. 3.

Figure 4A:
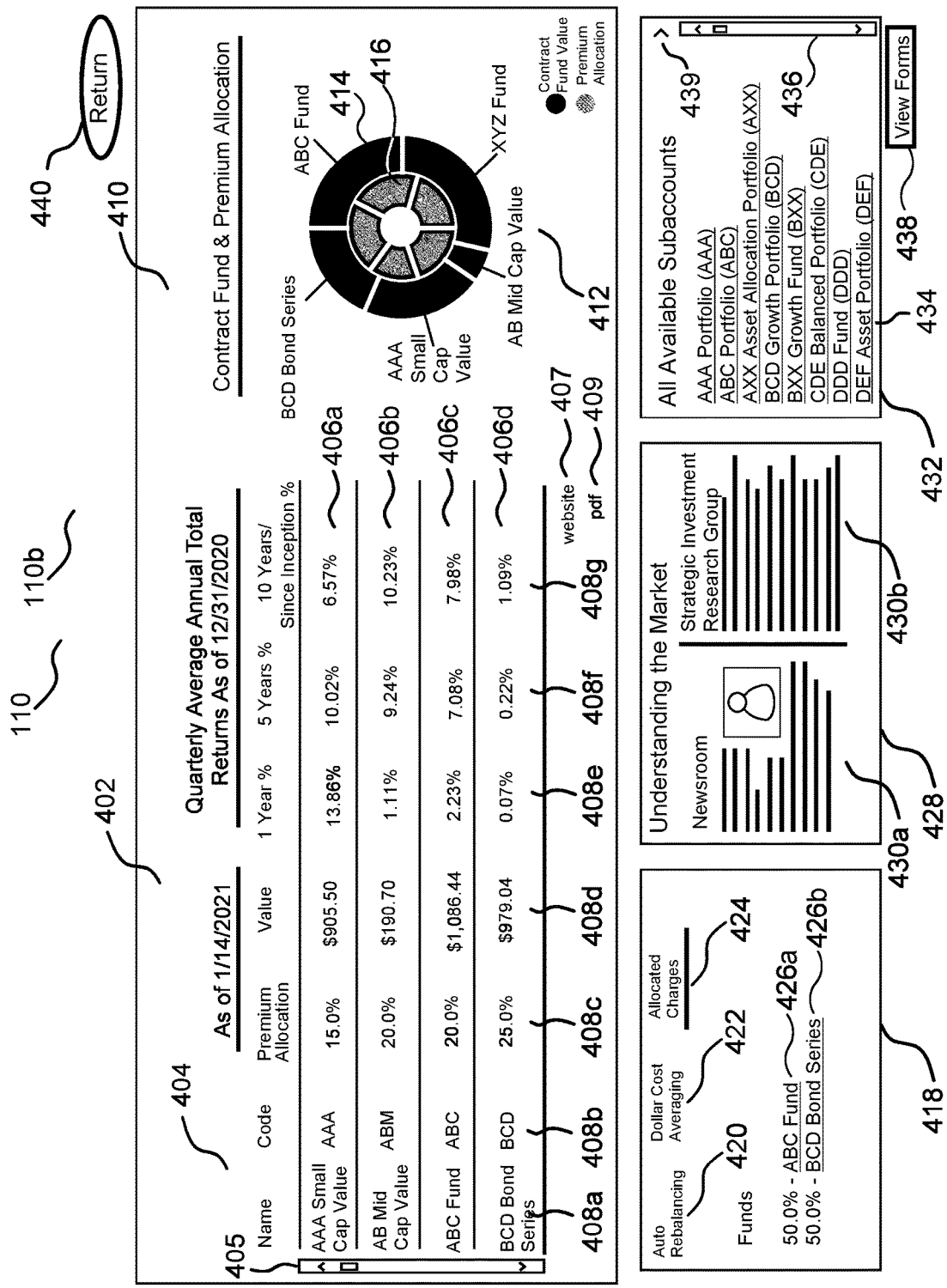
Figure 4C:
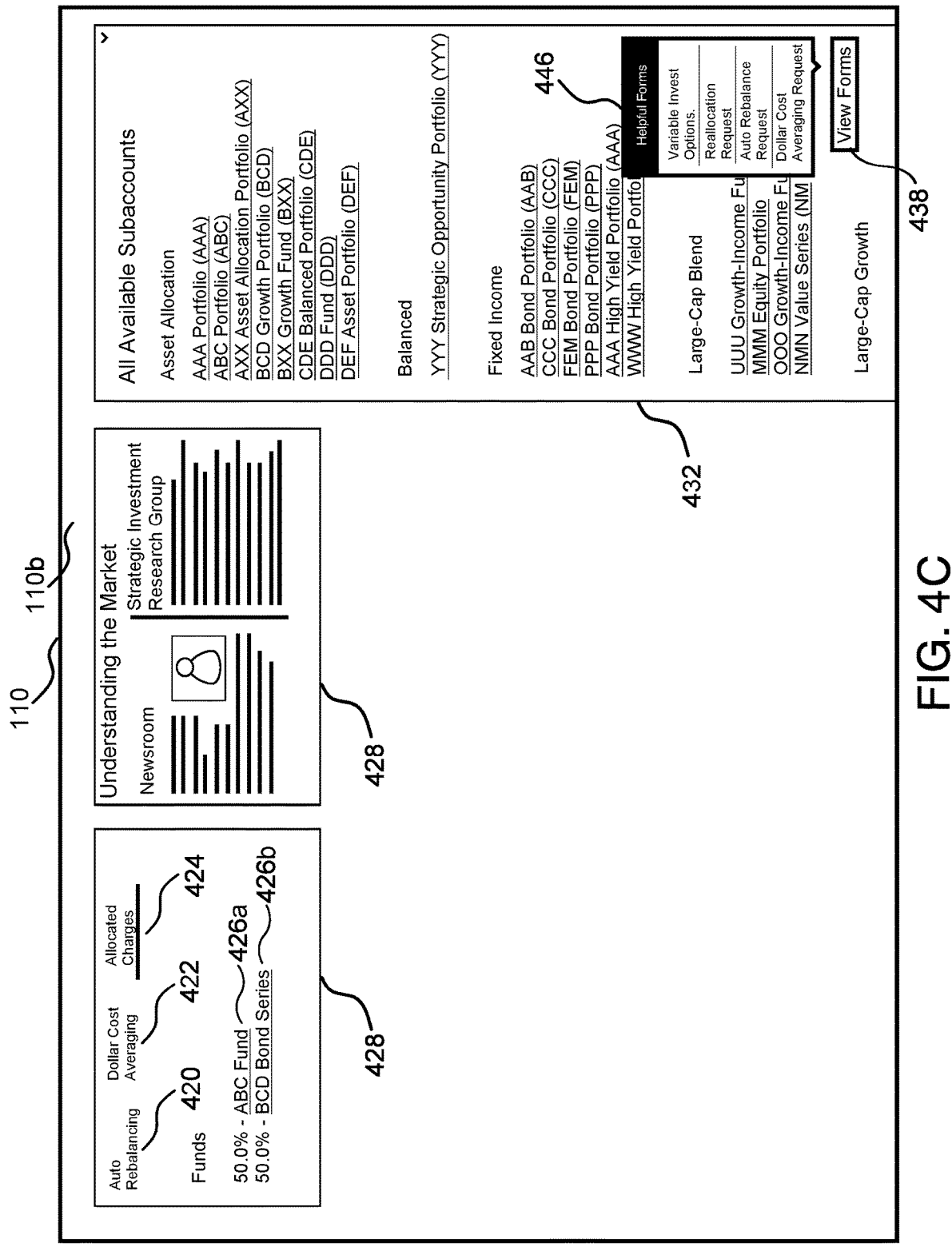

As illustrated in FIG. 3, main page 110*a* of graphical user interface 110 is configured to present a graphical representation 306 of the performance of a life insurance policy over time. In certain embodiments, main page 110*a* of graphical user interface 110 additionally displays a set of up to date information 304 about the policy. For example, as illustrated in FIG. 3, main page 110*a* of graphical user interface 110 may display information such as the net benefit of the current policy, the anticipated lapse date of the policy, the net cash value of the policy, and the rate of return of the policy in an upper portion of the display. Main page 110*a* of graphical user interface 110 may also display various links to additional policy information in further regions of display 109, enabling a user 104 to access all relevant information about a policy directly from the main page of the graphical user interface, rather than having to search through multiple documents and pages stored at various locations for such information, as is typically the case with conventional systems. As a specific example, in order to enable a user 104 to further investigate the historical and/or current performance of the life insurance policy, as illustrated in graphical illustration 306, main page 110*a* of graphical user interface 110 may display a link 312 through which user 104 may access information associated with the individual investments within the policy. FIGS. 4A through 4C illustrate examples of the information displayed by graphical user interface 110 in response to user 104 selecting this link. Additional details about main page 110*a* of graphical user interface 110, including the behavior of graphical user interface 110 in response to user 104 selecting one or more of the other links displayed in regions 308, 310, and 314 of main page 110*a*, may be found in U.S. Pat. No. 10,896,190, as well as in co-pending United States Patent Publication Number US 2021/0097066 and co-pending U.S. patent application Ser. No. 17/150,541, the entire contents of which are incorporated herein by reference.

III. Graphical User Interface

FIGS. 4A through 4C present examples of the use of graphical user interface 110 to display information associated with an investment account 116 (e.g., information associated with the one or more investments associated with a given life insurance policy). As described above, in certain embodiments, display tool 102 is configured to display this information as a page 110*b* of graphical user interface 110, in response to user 104 selecting a link (e.g., link 312 of FIG. 3) that is displayed on the main page 110*a* of graphical user interface 110. In such embodiments, page 110*b* of graphical user interface may include a button 440 that is selectable by user 104 to return to the main page 110*a*. In certain embodiments, page 110*b* of graphical user interface 110 may be accessible through a webpage belonging to the organization to which display tool 102 belongs. In some embodiments, page 110*b* of graphical user interface 110 may be accessible through a webpage hosted by a partner/affiliate of the organization to which display tool 102 belongs, and/or a webpage hosted by any other reasonable third-party website.

In some embodiments, page 110*b* of graphical user interface 110, as illustrated in FIGS. 4A through 4C, may correspond to the main page of the graphical user interface rather than a secondary page accessible from a main page. As an example, in certain embodiments, display tool 102 is configured to display page 110*b* in response to user 104 opening an application installed on his/her device 106, using his/her device 106 to access a webpage operated by display tool 102, and/or performing any other suitable action to access graphical user interface 110.

By generating page 110*b* of graphical user interface 110, certain embodiments of display tool 102 are able to provide life insurance policy producers with easily accessible information about the subaccounts 116 of a given investment account 114, the investment funds 124 into which the subaccounts 116 are invested, and the performance of these investment funds, all in one place and presented in a manner that is easy to understand. This is in contrast to conventional systems used by policy producers, in which such information is typically scattered across multiple locations (e.g., across multiple GUI pages, available in multi-page documents, and/or otherwise time consuming and/or difficult to access). In particular, in order to access such information for a given policy using a conventional system, the producer of the policy would typically need to (1) access a policy-level prospectus that includes information on all of the investment funds that are/were available to the policy owner, (2) determine which investment funds the policy owner is invested in, (3) locate those investment funds within the prospectus document, and (4) use the associated information to determine how each investment is currently performing.

As illustrated in FIGS. 4A and 4B, page 110*b* of graphical user interface 110 may include one or more different regions—e.g., first region 402, second region 410, third region 418, fourth region 428, and fifth region 432. Certain embodiments of graphical user interface 110 may include all five regions 402, 410, 418, 428, and 432, or a subset of the five regions. In some embodiments, graphical user interface 110 may include additional/different regions from those displayed in FIGS. 4A and 4B. For example, in certain embodiments, the information displayed in one or more of regions 402, 410, 418, 428, and/or 432 may be replaced with different information. In some embodiments, the sizes of one or more of regions 402, 410, 418, 428, and/or 432 may be adjusted as compared to the sizes illustrated in FIGS. 4A and 4B. For example, in certain embodiments in which display tool 102 displays more than five regions on page 110*b* of graphical user interface 110, the sizes of one or more of regions 402, 410, 418, 428, and/or 432 may be reduced as compared to the sizes of the regions as illustrated in FIGS. 4A and 4B. As another example, in certain embodiments, display tool 102 may adjust one or more of regions 402, 410, 418, 428, and/or 432 depending on the display 109 on which graphical user interface 110*b* is displayed. For example, in certain embodiments in which graphical user interface 110*b* is displayed on the display of a mobile phone 106, display tool 102 may display second region 410 initially on display 109, with one or more other regions of the graphical user interface accessible to user 104 through a scroll bar.

a. Interactive Table

First region 402 of page 110*b* of graphical user interface 110 is used to present a table 404 of information associated with account 114. As illustrated in FIG. 4A, table 404 includes a set of rows 406*a* through 406*d*, each of which includes a set of fields 408*a* through 408*g*. While illustrated, for simplicity, in FIGS. 4A and 4B as including four rows 406, with each row including seven fields 408, this disclosure contemplates that table 404 may include any number of rows 406 and any number of fields 408. In some embodiments, graphical user interface 110 is configured to display at most a set number N of rows 406 of table 404, with any additional rows 406 of the table accessible to user 104 through a scroll bar 405. In some embodiments, graphical user interface 110 is configured to display up to six rows 406 of table 404, with one or more additional rows 406 accessible through scroll bar 405. N may be chosen in any suitable manner. For example, N may be chosen so that it corresponds to the average number of subaccounts 116 used by accounts 114. This may be desirable so that, for a large number of accounts 114, graphical user interface 110 displays all of the rows 406 of the corresponding table 404.

Each row 406a through 406d of table 404 is associated with a subaccount 116 of account 114. For example, first row 406a may be associated with first subaccount 116a of account 114a, second row 406b may be associated with second subaccount 116b of account 114a, third row 406c may be associated with third subaccount 116c of account 114a, and fourth row 406d may be associated with fourth subaccount 116d of account 114a. In certain embodiments, table 404 includes a row 406 for each subaccount 116 of account 114.

Each row 406 displays information relating to the subaccount 116 to which the row is associated. In certain embodiments, this information includes information relating to the investment fund 124 into which premium payments/contributions allocated to the associated subaccount 116 have been invested. For example, as illustrated in FIGS. 4A and 4B, each row 406 displays: (1) a first field 408a that includes the name of the associated investment fund 124; (2) a second field 408b that includes a code assigned to the associated investment fund 124; (3) a third field 408c that includes a premium allocation amount 120 assigned to the associated subaccount 116; (4) a fourth field 408d that includes a value 118 of the associated subaccount 116; (5) a fifth field 408e that includes a quarterly average annual total return for the associated investment fund 124 over the past year; (6) a sixth field 408f that includes a quarterly average annual total return for the associated investment fund 124 over the past five years; and (7) a seventh field 408g that includes a quarterly average annual total return for the associated investment fund 124 over the past ten years and/or since the inception of the fund.

In certain embodiments, user 104 may adjust the order in which rows 406a through 406d are presented in table 404. For example, user 104 may interact with a given field 408 (e.g., by clicking on the name of the field, by clicking on an element displayed next to the name of the field, and/or in any other suitable manner) to reorder the rows 406 of table 404, based on the values displayed in that field. For instance, in response to user 104 interacting with the "Value" field 408d, display tool 102 may update table 404 to display the values 118 of subaccounts 116a through 116d in increasing order—e.g., display row 406b as the first row of the table, row 406a as the second row of the table, row 406d as the third row of the table, and row 406c as the forth row of the table. Alternatively, or additionally, display tool 102 may update table 404 to display the values 118 of subaccounts 116a through 116d in decreasing order. As an example, where user 104 interacts with the "Value" field 408d by clicking on the name "Value," in response to user 104 clicking on the name a first time, display tool 102 may reorder table 404 such that the values 118 are displayed in increasing order. In response to user 104 clicking on the name a second time, display tool 102 may reorder table 404 such that the values 118 are displayed in decreasing order. As another example, in embodiments in which user 104 may interact with the "Value" field 408d through an element displayed next to the name of the field, such element may include a first part (e.g., a down arrow), and a second part (e.g., an up arrow). In response to user 104 selecting (e.g., clicking on) the first part of the element, display tool 102 may reorder table 404 such that the values 118 are displayed in increasing order. Similarly, in response to user 104 selecting (e.g., clicking on) the second part of the element, display tool 102 may reorder table 404 such that the values 118 are displayed in decreasing order.

Display tool 102 may obtain the information displayed in table 404 from first database 112 and/or second database 122. For example, each time user 104 requests that display tool 102 generate page 110b of graphical user interface 110, display tool 102 may access first database 112 and/or second database 122 and use the information stored therein to display up-to-date information associated with investment account 114. In some embodiments, display tool 102 is designed to update the information displayed in table 404 in real time. For example, display tool 102 may be designed to monitor first database 112 and/or second database 122 for any changes relevant to account 114, and update the associated information in table 404 in response to identifying such a change.

In certain embodiments, the name of each investment fund 124, displayed in field 408a, is selectable by user 104. User 104 may select the name in any suitable manner (e.g., by clicking on the name, double-clicking on the name, or performing any other suitable action associated with the name). In response to user 104 selecting the name of a given investment fund 124, display tool 102 is configured to display a fact sheet for the investment fund. For example, in response to user 104 selecting the name "AB Mid Cap Value" displayed in field 408a of row 406b, display tool 102 is configured to display a fact sheet that includes information associated with the AB Mid Cap Value Fund. Display tool 102 may display the fact sheet in any suitable manner. For example, in certain embodiments, display tool 102 may (1) generate a pop-up window that includes the fact sheet, (2) generate a new browser tab that displays the fact sheet, where page 110b is displayed in a first browser tab, (3) replace page 110b with a page of graphical user interface 110 that includes the fact sheet, and/or (4) presents the fact page to user 104 in any other suitable manner. This disclosure contemplates that the fact sheet associated with a given investment fund 124 is an industry-available fact sheet. For example, the fact sheets associated with investment funds 124 may be stored in second database 122, and/or hosted by a website external to system 100. For instance, in certain embodiments, for each investment fund 124a through 124p, display tool 102 may store a link to an Internet location at which the corresponding fact sheet may be found. Each fund fact sheet may include any suitable information. For example, the fact sheet may include: (1) the name of the fund; (2) one or more dates associated with the fund (e.g., when the fund information was published, when the fund was established, etc.); (3) a list of the largest investments made in the fund; (4) names of individuals who manage the investments in the fund; (5) one or more objectives associated with the fund; (6) any fees associated with the fund; (7) a risk assessment associated with the fund; and/or (7) any other suitable information related to the fund.

In certain embodiments, in addition with providing user 104 with access to the performance information of the investment funds 124 associated with a given account 114 (which may be a subset of the full set of investment funds 124a through 124p available to account 114), display tool 102 also provides user 104 with access to the performance information of all of the investment funds 124a through 124p available to account 114. For example, display tool 102 may display one or more links 407/409 on display 109, through which user 104 may interact in order to access such information. As an example, display tool 102 may display a first link 407, selectable by user 104 to cause display tool 102 to present a webpage on display 109 that includes the information. Display tool 102 may present the webpage to user 104 on display 109 in any suitable manner. For example, presenting the webpage may include (1) generating a pop-up window that includes the webpage, (2) generating a new browser tab that includes the webpage, where page 110b is displayed in a browser, (3) replacing page 110b with the webpage, and/or (4) presenting the webpage to user 104 in any other suitable manner. As another example, display tool 102 may display a second link 409, selectable by user 104 to cause display tool 102 to present a pdf file to user 104 that includes the information. In some embodiments, presenting the pdf file to user 104 may include automatically downloading the pdf file and opening it using a program installed on device 106.

b. Interactive Graphical Illustration

Second region 410 of page 110b of graphical user interface 110 is used by display tool 102 to present a graphical illustration 412 of information associated with account 114. As illustrated in FIG. 4A, graphical illustration 412 includes a first set of segments 414 associated with the values 118 of the subaccounts 116 belonging to account 114, and a second set of segments 416 associated with the allocation amounts 120 assigned to the subaccounts 116 belonging to account 114.

As illustrated in FIGS. 4A and 4B, in certain embodiments, first set of sections 414 correspond to segments of the outer ring of a pie chart. Similarly, second set of segments 416 may correspond to segments of the inner ring of the pie chart. Each segment of first set of segments 414 is assigned to a given subaccount 116, and depicts the current value 118 of the subaccount as compared with the values of the other subaccounts. For example, as illustrated in FIG. 4B, segment 414a is assigned to a subaccount 116a for which the value 118a of the subaccount is invested in the ABC Fund. Segment 414a occupies an area of the outer ring of pie chart 412 that is proportional to the value 118a of subaccount 116a, as compared with the total value of account 114 (e.g., the combined values of all of the subaccounts 116 belonging to account 114). Similarly, each segment of second set of segments 416 is assigned to a given subaccount 116, and depicts the allocation amount 120 associated with the subaccount. For example, as illustrated in FIG. 4B, segment 416a is assigned to a subaccount 116a and depicts the allocation amount 120a associated with that subaccount (e.g., the percentage of premium payments/contributions to account 114 that is to be allocated to subaccount 116a, the value of which is invested in the ABC Fund). Segment 416a occupies an area of the inner ring of pie chart 412 that is proportional to allocation amount 120a.

By presenting information associated with subaccounts 116 to user 104 in graphical illustration 412, user 104 may be able to easily and efficiently gain insight into the performance of the investment funds 124 into which account 114 is invested. For example, based on graphical illustration 412, as depicted in FIGS. 4A and 4B, user 104 may determine that AB Mid Cap Value Fund is performing poorly, in comparison with the other funds in which account 114 is invested, while XYZ Fund is performing well. At the same time, user 104 may see that the premium payments/contributions made to account 114 are split fairly evenly among subaccounts 116, with approximately the same percentage of each premium payment being invested in AB Mid Cap Value Fund as XYZ Fund. Accordingly, in response to a request from the owner of account 114 for investment advice, user 104 may advise the account owner to allocate a larger portion of his/her premium payments to the subaccount 116 that is invested in the XYZ Fund, and a smaller portion of his/her premium payments to the subaccount 116 that is invested in the AB Mid Cap Value Fund, based on a quick look at graphical illustration 412.

In certain embodiments, graphical illustration 412 includes one or more interactive elements. As example, in some embodiments, in response to a user 104 interacting with a segment 414/416 of graphical illustration 412 (e.g., clicking on the segment, hovering a cursor over the segment, and/or interacting with the segment in any other suitable manner), display tool 102 may generate a tooltip 444 associated with the segment. The tooltip may include any suitable information associated with the segment. For example, as illustrated in FIG. 4B, in response to user 104 interacting with segment 414a, display tool 102 may display tooltip 444 that includes the name of the investment fund 124 associated with the subaccount 116 to which segment 414a is assigned, the allocation amount 120 of the subaccount 116 to which segment 414a is assigned, and the value 118 of the subaccount 116 to which segment 414a is assigned. As a specific example, in response to user 104 interacting with segment 414a, display tool 102 may display tooltip 444 that indicates that 20.0% of premium payments/contributions to account 114 are invested in the ABC Fund, and that the current value of account 114 that is invested in ABC Fund is $1,086.44. In certain embodiments, in response to user 104 interacting with segment 416a, which is associated with the same subaccount 116 as segment 414a, display tool 102 may display a tooltip 444 that includes the same information as the tooltip displayed in response to user 104 interacting with segment 414a. In some embodiments, display tool 102 may display a tooltip 444 that includes different information from the tooltip displayed in response to user 104 interacting with segment 414a. For example, in response to user 104 interacting with segment 414a, display tool 102 may display a tooltip 444 that includes the value 118 of account 114 that is currently invested in ABC Fund (e.g., $1,086.44), but not the allocation amount 120 associated with this fund (e.g., 20.0%). Similarly, in response to user 104 interacting with segment 416a, display tool 102 may display a tooltip 444 that includes the allocation amount 120 that is associated with the ABC Fund (e.g., 20.0%), but not the value 118 of account 114 that is currently invested in the fund (e.g., $1,086.44).

As another example of an interactive element associated with graphical illustration 412, in certain embodiments, in response to user 104 interacting with a segment 414/416 of graphical illustration 412 (e.g., clicking on the segment, hovering a cursor over the segment, and/or interacting with the segment in any other suitable manner), display tool 102 may highlight the segment displayed on graphical user interface 110. Highlighting the segment may involve changing a color of the segment (e.g., changing the color of the segment to white, as illustrated in FIG. 4B), increasing a size of the segment, adjusting a position of the segment, and/or performing any other suitable action that distinguishes the segment from the other segments 414/416. In certain embodiments, in response to user 104 interacting with a given segment 414/416 of graphical illustration 412, display tool 102 may be configured to highlight only that segment. For example, in response to user 104 interacting with segment 414*a*, display tool 102 may highlight segment 414*a*. Similarly, in response to user 104 interacting with segment 416*a*, display tool 102 may highlight segment 416*a*. In some embodiments, in response to user 104 interacting with a given segment 414/416, display tool 102 may be configured to highlight both the given segment as well as any other segments that are associated with the same subaccount 116 as the segment with which user 104 interacted. For example, in response to user 104 interacting with segment 414*a*, display tool 102 may highlight segment 414*a* and segment 416*a*, where both segments are associated with the same subaccount 116 (e.g., the subaccount 116 for which the value 118 of the subaccount is invested in the ABC Fund). Similarly, in response to user 104 interacting with segment 416*a*, display tool 102 may highlight both segment 414*a* and segment 416*a*.

In certain embodiments, information displayed pictorially as a segment 414/416 of graphical illustration 412 is linked with corresponding information displayed in table 404. For example, display tool 102 may store information linking each segment of the first set of segments 414 with the corresponding value displayed in fourth field 408*d* of table 404, and/or information linking each segment of the second set of segments 416 with the corresponding premium allocation amount displayed in field 408*c* of table 404. In some such embodiments, in response to user 104 interacting with a given segment 414/416 of graphical illustration 412, display tool 102 may highlight the row 406 of table 404 that holds the corresponding information. For example, in response to user 104 interacting with segment 414*a* (which corresponds to the value 118 of the subaccount 116 that is invested in the ABC Fund) or segment 416*a* (which corresponds to the allocation amount 120 assigned to the subaccount 116 that is invested in the ABC Fund), display tool 102 may apply highlighting 442 to row 406*c* of table 404 (which displays information about the subaccount 116 that is invested in the ABC Fund, as well as information about the performance of the ABC Fund). Display tool 102 may apply any suitable highlighting 442 to rows 406 of table 404. For example, applying highlighting 442 to a given row 406 may involve adjusting a background color of the row, adjusting a size of the row, adjusting a font of the text displayed in the row, adding a shape around the entries displayed in the row (e.g., surrounding the entries in a rectangle, as illustrated in FIG. 4B), or performing any other suitable action to distinguish the row from the other rows of table 404. In certain embodiments, if user 104 interacts with a segment 414/416 of graphical illustration 412 for which the corresponding row 406 of table 404 is not currently displayed in region 402 of graphical user interface 110 (e.g., the row is accessible to user 104 through scroll bar 405), display tool 102 may automatically adjust the rows 406 of table 404 that are displayed in region 402, in order to display and apply highlighting 442 to the corresponding row (e.g., display tool 102 may automatically operate scroll bar 405 such that the row becomes visible in region 402).

In some embodiments, in response to user 104 interacting with a row 406 of table 404, display tool 102 is configured to apply highlighting to one or more of the corresponding segments 414/416 of graphical illustration 412. For example, as illustrated in FIG. 4B, in response to user 104 interacting with row 406*c* of table 404 (e.g., hovering a cursor over the row, clicking on an element of the row, and/or interacting with the row in any other suitable manner), display tool 102 may highlight segment 414*a* and/or segment 416*b*, both of which are associated with the same subaccount as row 406*c*. In some embodiments, display tool 102 may also generate and display tooltip 444. For example, in some embodiments, in response to user 104 interacting with the premium allocation field 408*b* displayed in row 406*c* (e.g., 20.0%), display tool 102 may display tooltip 444 over segment 416*a*. Similarly, in response to user 104 interacting with the value field 408*c* displayed in row 406*c* (e.g., $1,086.44), display tool 102 may display tooltip 444 over segment 414*a*. In some embodiments, in response to user 104 interacting with display 109 anywhere in the region of the display covered by row 406*c*, display tool 102 may display a single tooltip 444 (e.g., a tooltip 444 over segment 414*a*, or a tooltip 444 over segment 416*a*), or multiple tooltips 444 (e.g., a first tooltip 444 over segment 414*a* and a second tooltip 444 over segment 416*a*).

As illustrated in FIGS. 4A and 4B, in certain embodiments, display tool 102 displays first region 402 of page 110*b* of graphical user interface 110 (on which display tool 102 displays table 404) next to second region 410 of page 110*b* (on which display tool 102 displays graphical illustration 412). This may be desirable to enable user 104 to easily view highlighting displayed in table 404, in response to user 104 interacting with one or more of segments 414/416, and/or highlighting displayed in graphical illustration 412, in response to user 104 interacting with one or more rows 406 of table 404. In some embodiments, rather than displaying first region 402 next to second region 410, display tool 102 may display graphical illustration 412 sized to fit display 109, with additional regions of page 110*b* of graphical user interface 110 accessible to user 104 through a scroll bar displayed on the display. For example, where device 106 is a mobile phone or other device for which display 109 is limited in size, it may be difficult for user 104 to easily obtain information from table 404 and/or graphical illustration 412, in embodiments in which table 404 and graphical illustration 412 are displayed side-by-side. Accordingly, it may be desirable to display graphical illustration 412 sized to fit display 109, in embodiments in which device 106 includes a small display 109 (e.g., a mobile phone), in order to enable user 104 to easily obtain information about account 114, based on the information presented in graphical illustration 412.

While illustrated in FIGS. 4A and 4B as including both first set of segments 414 and second set of segments 416, in certain embodiments, graphical illustration 412 may include only one of first set of segments 414 and second set of segments 416. In some embodiments, graphical illustration 412 may include one or more additional sets of segments. For example, in certain embodiments, graphical illustration 412 may include a set of segments associated with the starting value of each subaccount 116 of account 114.

Additionally, while illustrated in FIGS. 4A and 4B as taking the form of a double ring pie chart/donut chart, display tool 102 may present graphical illustration 412 on graphical user interface 110 in any suitable form. For example, in certain embodiments, graphical illustration 412 may be a bar chart, a stacked bar chart, a pie chart, a sunburst chart, a histogram, and/or any other suitable graph, chart, or other illustration.

c. Account Management Tools

Regions 418, 428, and 432 of page 110*b* of graphical user interface 110 may be used by display tool 102 to present user 104 with additional information associated with account 114 and/or information that may be useful for user 104 in understanding and/or modifying account 114. For example, in certain embodiments, display tool 102 may display information about a set of options available to account 114, in third region 418 of page 110*b*. In particular, display tool 102 may display information associated with an auto rebalancing option, a dollar cost averaging option, and/or a charge allocation option, each of which is described in detail below. Each of the names of the options may correspond to labels 420, 422, and 424 that are selectable by user 104, to display one or more adjustable variables associated with the corresponding option. For example, "Auto Rebalancing" label 420 may be selected by user 104 to view values that may have been set for one or more variables associated with an auto rebalancing option for account 114, "Dollar Cost Averaging" label 422 may be selected by user 104 to view values that may have been set for one or more variables associated with a dollar cost averaging option for account 114, and "Allocated Charges" label 424 may be selected by user 104 to view values that may have been set for one or more variables associated with an allocated charges option for account 114. In certain embodiments, in response to user 104 selecting one of labels 420, 422, or 424, display tool 102 is configured to highlight the name of the label. For example, as illustrated in FIGS. 4A and 4B, in response to user 104 selecting "Allocated Charges" label 424, display tool 102 is configured to highlight "Allocated Charges" by underlining the name. Display tool 102 may highlight the names associated with labels 420, 422, and/or 424 in any suitable manner. For example, display tool 102 may highlight the name by adjusting the color of the background associated with the name, increasing a size of the font used for the name, adjusting the font used for the name, and/or performing any other action to distinguish the name with which user 104 interacted from the other names (e.g., distinguishing "Allocated Charges" from "Auto Rebalancing" and "Dollar Cost Averaging," as illustrated in FIGS. 4A and 4B).

As a first example of the use of region 418 by user 104, in certain embodiments, in response to user 104 selecting "Auto Rebalancing" label 420, display tool 102 is configured to display a list of zero or more of the investment funds 124 associated with account 114 (e.g., zero or more of the investment funds 124 into which subaccounts 116 of account 114 are invested), a percentage assigned to each listed investment fund 124, a date at which rebalancing is next set to occur, and a frequency at which rebalancing is to be performed (e.g., monthly, quarterly, etc.). As a specific example, in response to user 104 selecting "Auto Rebalancing" label 420, display tool 102 may display the following list of {investment fund 124, percentage} pairs: ({"AAA Small Cap Value," 20%}, {"AB Mid Cap Value," 20%}, {"ABC Fund," 20%}, {"BCD Bond Series," 20%}, {"XYZ Fund", 20%}), along with a date of Feb. 1, 2021, and a frequency of "Monthly." This set of information indicates that, on a monthly basis (the next occurrence of which is Feb. 1, 2021), the value 118 of each subaccount 116 that is invested in one of the listed investment funds 124, is to be adjusted so that the adjusted value corresponds to 20% of the total value of account 114 (e.g., the total value of all of the subaccounts 116 within account 114).

As another example of the use of region 418 by user 104, in certain embodiments, in response to user 104 selecting "Dollar Cost Averaging" label 422, display tool 102 is configured to display a list of zero or more of the investment funds 124 associated with account 114 (e.g., zero or more of the investment funds 124 into which subaccounts 116 of account 114 are invested), a percentage assigned to each listed investment fund 124, a money market fund from which money is to be transferred, a date at which dollar cost averaging is next set of occur, and a frequency at which dollar cost averaging is to be performed (e.g., monthly, quarterly, annually, etc.). As a specific example, in response to user 104 selecting "Dollar Cost Averaging" label 422, display tool 102 may display the following list of {investment fund 124, percentage} pairs: ({"AAA Small Cap Value," 80%}, {"AB Mid Cap Value," 20%}), along with a specified money market fund and corresponding percentage of: {"Automatic Money Market", 100%}, date of Apr. 1, 2021, and a frequency of "Quarterly." This set of information indicates that, on a quarterly basis (the next occurrence of which is Apr. 1, 2021), 100% of the money sitting in the Automatic Money Market fund is to be transferred, with 80% being added to the subaccount 116 that is invested in the AAA Small Cap Value fund, and 20% being added to the subaccount 116 that is invested in the AB Mid Cap Value fund.

As a further example of the use of region 418 by user 104, in certain embodiments, in response to user 104 selecting "Allocated Charges" label 424, display tool 102 is configured to display a list of zero or more of the investment funds 124 associated with account 114 (e.g., zero or more of the investment funds 124 into which subaccounts 116 of account 115 are invested), and a corresponding percentage assigned to each listed investment fund 124. As a specific example, as illustrated in FIGS. 4A through 4C, in response to user 104 selecting "Allocated Charges label 424, display tool 102 displays information 426a, indicating that 50.0% of the fees assessed on account 114 are to be paid from the subaccount 116 that is invested in the ABC Fund, and information 426b, indicating that the remaining 50.0% of the fees assessed on account 114 are to be paid from the subaccount 116 that is invested in the BCD Bond Series fund.

In certain embodiments, the information displayed in third region 418 is displayed for informational purposes. For example, in some embodiments, user 104 may not be able to use graphical user interface 110 to directly modify any of the information displayed in third region 418 (e.g., any of the variables associated with an auto rebalancing option, a dollar cost averaging option, and/or an allocated charges option). However, in some such embodiments, graphical user interface 110 may include one or more features that may aid user 104 in initiating a procedure through which the user may modify all or a portion of this information (e.g., one or more of the variables associated with an auto rebalancing option, a dollar cost averaging option, and/or an allocated charges option). As an example, in certain embodiments, user 104 may initiate the process of implementing one or more changes to the variables associated with one or more of the auto rebalancing option, the dollar cost averaging option, and/or the allocated charges option by submitting a form to the organization with which account 114 is held, requesting that such change(s) be made. In certain embodiments, user 104 may use graphical user interface 110 to access such a form. For example, in response to selecting "View Forms" button 438, displayed on page 110b of graphical user interface 110, display tool 102 is configured to display a list 446 of "Helpful Forms" on display 109, as illustrated in FIG. 4C. List 446 includes a list of form names (e.g., "Variable Invest. Options," "Reallocation Request," "Auto Rebalance Request," "Dollar Cost Averaging Request") each of which is selectable by user 104. In response to user 104 selecting a given form name (e.g., "Reallocation Request"), display tool 102 is configured to cause device 106 to download the corresponding form (e.g., a reallocation request form), and display the form on display 109. The form may be an electronically fillable form (e.g., a fillable pdf document), or a form that user 104 may print and fill out by hand. User 104 may use the form to specify one or more changes to be made to account 114 (e.g., one or more changes to be made to variable(s) associated with the auto rebalancing option, the dollar cost averaging option, and/or the allocated charges option associated with account 114). User 104 may then transmit the completed form to the organization with which account 114 is held, to request that the specified changes are applied to the account. User 104 may transmit the form to the organization in any suitable manner. For example, in certain embodiments, user 104 may (1) email the form to an email address belonging to the organization, (2) print a physical copy of the form and mail it to an address belonging to the organization, (3) submit the form through a webform provided on a webpage belonging to the organization, and/or (4) submit the form to the organization in any other suitable manner. In certain embodiments, graphical user interface 110 may display a link through which user 104 may submit the form.

In some embodiments, user 104 may use graphical user interface 110 to directly adjust the value of one or more variables associated with account 114 and displayed in region 418. As an example, in certain embodiments, in response to user 104 selecting one of labels 420, 422, and/or 424, display tool 102 may display the information associated with the label (e.g., information 426a/426b) in one or more editable fields in region 428. For instance, in the example illustrated in FIG. 4A, each of "50.0%," and "ABC Fund" of information 426a, and "50.0%" and "BCD Bond Series" of information 426b may be displayed in an editable field such that it is adjustable by user 104. As another example, in certain embodiments, in response to user 104 selecting one of labels 420, 422, and/or 424, display tool 102 may display a button on graphical user interface 110 that is selectable by user 104 to adjust the value of one or more variables associated with the selected label (e.g., one or more of the values displayed in region 418 in response to user 104 selecting the label). For example, in response to user 104 selecting the button displayed on graphical user interface 110, display tool 102 may display a pop-up window on display 109 through which user 104 may submit changes to be made to the value of one or more of the variables associated with account 114.

While display tool 102 uses regions 402, 410, and 418 to display information associated with a given account 114, in certain embodiments, display tool 102 uses regions 428 and 432 to display general information that may not be associated with a given account 114. For example, the information displayed in regions 428 and 432 for a first account 114a may be the same as the information displayed in regions 428 and 432 for a second account 114b.

Region 428 may be used by display tool 102 to display educational information and/or information that may be of interest to user 104. In certain embodiments, the information displayed in region 428 includes all or a portion of information available through a source external to system 100. For example, the information displayed in region 428 may correspond to information available on a webpage (e.g., a webpage belonging to the organization with which account 114 is held). In some such embodiments, the information displayed in region 428 may be linked to the corresponding webpage, and selectable by user 104. For example, a first piece of information 430a displayed in region 428 may be linked to a first webpage, and second piece of information 430b displayed in region 428 may be linked to a second webpage. In response to user 104 interacting with information 430a or 430b (e.g., clicking on the information, double-clicking on the information, and/or interacting with the information in any other suitable manner), display tool 102 may be configured to display the linked webpage on display 109. For example, display tool 102 may (1) generate a pop-up window that displays the linked webpage, (2) generate a new browser tab that displays the linked webpage, where page 110b is displayed in a first browser tab, (3) replace page 110b with the linked webpage, and/or (4) present the linked webpage to user 104 in any other suitable manner.

In certain embodiments, one or both of the link to the webpage and the webpage, itself, may be dynamic. For example, in certain embodiments, the link associated with first piece of information 130a may be a static link to a webpage that displays dynamic content. Accordingly, display tool 102 may be configured to update the content of first piece of information 430a, in response to a corresponding update to the content of the linked webpage, even though the address of the webpage linked to the information remains unchanged. As another example, in certain embodiments, one or both of the links associated with first piece of information 130a and second piece of information 130b may be dynamic links that are updated at certain times (e.g., periodically). For example, the links may rotate through a collection of available links. In certain such embodiments, each time a link is updated, display tool 102 may also update the corresponding information 430a/430b displayed in region 428.

Region 432 of graphical user interface 110b is used by display tool 102 to display a list 434 of all of the available investment funds 124 into which the subaccounts 116 of account 114 may be invested (e.g., all of the investment funds 124 available to account 114). Each fund name listed in list 434 may be selectable by user 104. User 104 may select the name in any suitable manner (e.g., by clicking on the name, double-clicking on the name, or performing any other suitable action associated with the name). In response to user 104 selecting the name of a given investment fund 124 listed in list 434, display tool 102 is configured to display a fact sheet for the investment fund. The displayed fact sheet may include the same information as described above, for the selectable fund names displayed in field 408a of table 404. For example, in certain embodiments, the fund sheet displayed by display tool 102 in response to user 104 selecting "AAA Small Cap Value" from field 408a of table 404 is the same as the fund sheet display by display tool 102 in response to user 104 selecting the corresponding fund from list 434.

In certain embodiments, the number of available investment funds 124 listed in list 434 may be quite large. Accordingly, in some embodiments, graphical user interface 110b displays only a portion of list 434 in region 432. In certain such embodiments, user 104 may view all of the funds listed in list 434 by using scroll bar 436, to scroll through the funds in the list. In some embodiments, user 104 may request that display tool 102 expand the number of funds of list 434 that are displayed in graphical user interface 110b, through the use of button 439. FIG. 4C illustrates graphical user interface 110b in response to user 104 selecting button 439.

As illustrated in FIG. 4C, in response to user 104 selecting button 439, display tool 102 expands graphical user interface 110b, so that the full list 434 is displayed within the graphical user interface. In certain embodiments, and as illustrated in FIG. 4C, only a portion of the expanded graphical user interface 110b fits on display 109 of device 106. In such embodiments, user 104 may view the contents of graphical user interface 110b by adjusting the portion of the interface that is displayed on display 109. For example, where graphical user interface 110b is displayed in a browser, user 104 may use a scroll bar to scroll through the contents of the interface.

In certain embodiments, user 104 may use the information provided in region 432 when filling out one or more of the forms displayed in the "Helpful Forms" list 446, and accessible through the "View Forms" button 438. In order to help enable user 104 to easily locate button 438, in certain embodiments, button 438 is a floating button designed to float within graphical user interface 110b. As an example, in certain embodiments in which graphical user interface 110b is displayed within a browser, button 438 is anchored to a location within the browser, and accordingly floats within graphical user interface 110b, in embodiments in which graphical user interface 110b is larger than the browser. For example, button 438 may be anchored to a position near the lower righthand corner of the browser, as illustrated in FIG. 4C. If user 104 wishes to view more of list 434 (e.g., the content of list 434 below "Large-Cap Growth"), user 104 may adjust the content of graphical user interface 110b that is displayed in the browser. When the user performs this adjustment, the position of button 438 may change relative to the content of graphical user interface 110b, but not relative to the browser in which graphical user interface 110b is displayed (e.g., button 438 will remain in the lower righthand corner of the browser).

III. Method of Operating the Graphical User Interface

Figure 5:
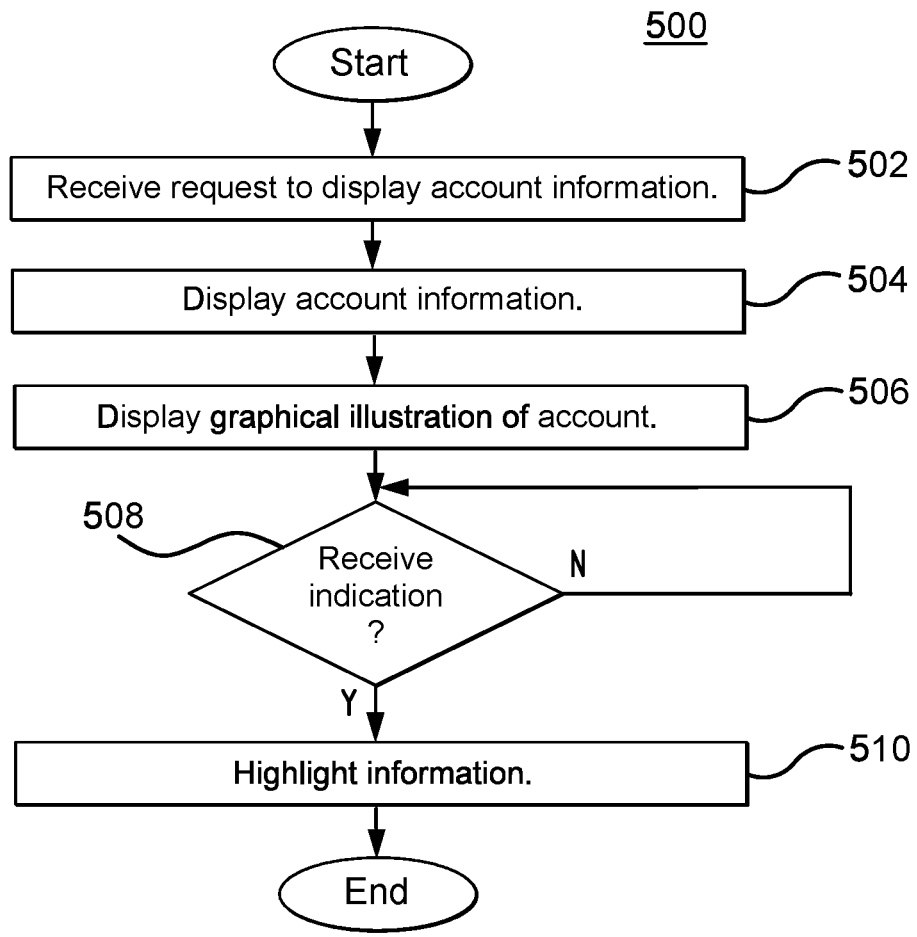
FIG. 5 presents a flowchart illustrating the process by which the system of FIG. 1 displays information on the graphical user interface of FIGS. 4A through 4C in response to a user's interactions with the interface.

FIG. 5 illustrates an example method 500 (described in conjunction with elements of FIGS. 1, 3, and 4A through 4C) by which display tool 102 displays information on graphical user interface 110. In step 502 display tool 102 receives a request to display information associated with an account 114. For example, in certain embodiments, display tool 102 may determine that user 104 selected a link 312 displayed on the main page 110a of graphical user interface 110, where main page 110a displays information about a life insurance policy associated with account 114. In step 504 display tool 102 displays information associated with the subaccounts 116 of account 114 as table 404. For each subaccount 116 of account 114, table 404 includes a row 406 that displays a set of information about the subaccount 116 in fields 408a through 408g. This information may include, for example, the name of the investment fund 124 associated with the subaccount, a code assigned to the investment fund 124 associated with the subaccount, an allocation amount 120 assigned to the subaccount, a current value 118 of the subaccount, and/or historical performance information about the investment fund 124 associated with the subaccount. In step 506 display tool 102 displays information associated with the subaccounts 116 of account 114 as graphical illustration 412. For each subaccount 116 of account 114, graphical illustration 412 may include one or more segments 414/416. For example, in certain embodiments, for each subaccount 116 of account 114, graphical illustration 412 includes a segment 414 representing the value 118 of the subaccount, and a segment 416 representing the allocation amount 120 assigned to the subaccount. In certain embodiments, display tool 102 performs steps 504 and 506 in parallel, such that both table 404 and graphical illustration 412 are displayed at the same time.

In step 508 display tool 102 determines whether it has received an indication that user 104 has interacted with an interactive element of table 404 and/or graphical illustration 412. For example, in certain embodiments, display tool 102 may determine whether user 104 has (1) hovered a cursor over a row 406 of table 404, (2) clicked on a field 408 of table 404, (3) hovered a cursor over a segment 414/416 of graphical illustration 412, (4) clicked on a segment 414/416 of graphical illustration 412, and/or (5) interacted with table 404 and/or graphical illustration 412 in any other suitable manner. If, in step 508 display tool 102 determines that it has not received an indication that user 104 has interacted with an interactive element of table 404 and/or graphical illustration 412, display tool 102 continues to monitor for such interactions. On the other hand, if, in step 508 display tool determines that it has received an indication that user 104 has interacted with an interactive element of table 404 and/or graphical illustration 412, in step 510 display tool 102 highlights the information displayed in table 404 and/or graphical illustration 412 that is associated with the user's interaction. For example, in certain embodiments, display tool 102 highlights the row 406 associated with the user's interaction, and/or one or more of the segments 414 and 416 associated with the user's interaction. In certain embodiments, display tool 102 may repeat steps 508 and 510 any number of times, while user 104 continues to interact with graphical user interface 110.

Modifications, additions, or omissions may be made to method 500 depicted in FIG. 5. Method 500 may include more, fewer, or other steps. For example, steps may be performed in parallel or in any suitable order. While discussed as display tool 105 (or components thereof) performing the steps, any suitable component of system 100 may perform one or more steps of the method.

What is claimed is:

1. An apparatus comprising:
   a display;
   a memory configured to store information associated with an account comprising a set of subaccounts, the information comprising:
   a set of allocation amounts, each allocation amount being assigned to a subaccount of the set of subaccounts, and indicating a percentage of a premium payment allocated to the subaccount; and
   a set of values, each value associated with a subaccount of the set of subaccounts, and indicating an amount invested in an investment fund associated with the subaccount; and
   a hardware processor communicatively coupled to the memory and the display, the hardware processor configured to:
   receive a request to display the information associated with the account;
   display on a first region of the display a table comprising one or more rows, each row assigned to a subaccount of the set of subaccounts and comprising:
   a name assigned to the subaccount;
   the allocation amount assigned to the subaccount; and
   the value of the subaccount;
   display on a second region of the display a graphical illustration associated with the account, the graphical illustration comprising:
   an interactive pie chart comprising:
   an inner ring comprising a first set of segments, wherein each segment of the first set of segments corresponds to a subaccount of the set of subaccounts and defines an area on the display that is proportional to the allocation amount assigned to the corresponding subaccount; and
   an outer ring encompassing the inner ring and comprising a second set of segments, wherein each segment of the second set of segments corresponds to a subaccount of the set of subaccounts and defines an area on the display that is proportional to the value associated with the corresponding subaccount;

display on a third region of the display information determined to be of interest to a user of the account, wherein the information is linked to a corresponding webpage;

present the webpage on the display in response to receiving a selection of at least a subset of the information;

receive a user interaction indicating a first subaccount of the set of subaccounts, wherein the user interaction indicating the first subaccount of the set of subaccounts comprises one of:
 a user interaction with the row of the table assigned to the first subaccount;
 a user interaction with the segment of the first set of segments that corresponds to the first subaccount; and
 a user interaction with the segment of the second set of segments that corresponds to the first subaccount; and in response to receiving the user interaction indicating the first subaccount of the set of subaccounts:
 display information describing the investment fund associated with the first subaccount of the set of subaccounts in a pop-up window on the display;
 emphasize the row of the table assigned to the first subaccount;
 highlight the segment of the first set of segments that corresponds to the first subaccount by changing a color, position, or size of the segment of the first set of segments that corresponds to the first subaccount; and
 highlight the segment of the second set of segments that corresponds to the first subaccount by changing a color, position, or size of the segment of the second set of segments that corresponds to the first subaccount.

2. The apparatus of claim 1, wherein:
in response to receiving the request to display the information, the hardware processor is further configured to access a database storing historical performance information, the historical performance information comprising, for each investment fund associated with a subaccount of the set of subaccounts, an average return of the investment fund over a set period of time; and
each row of the displayed table further comprises the average return of the investment fund associated with the subaccount of the set of subaccounts to which the row is assigned.

3. The apparatus of claim 1, wherein:
emphasizing the row of the table assigned to the first subaccount comprises at least one of:
 adjusting a background color of the row;
 increasing a size of the row; and
 adjusting a property of text displayed within the row.

4. The apparatus of claim 1, wherein the user interaction indicating the first subaccount comprises at least one of:
a user hovering a cursor over at least one of:
 the row of the table assigned to the first subaccount;
 the segment of the first set of segments corresponding to the first subaccount; and
 the segment of the second set of segments corresponding to the first subaccount; or
the user clicking on at least one of:
 the row of the table assigned to the first subaccount;
 the segment of the first set of segments corresponding to the first subaccount; and
 the segment of the second set of segments corresponding to the first subaccount.

5. The apparatus of claim 1, wherein the hardware processor is further configured to display additional information describing the investment fund associated with the first subaccount of the set of subaccounts, wherein displaying the additional information comprises at least one of:
 executing an application configured to display a document comprising the additional information describing the investment fund associated with the first subaccount of the set of subaccounts, wherein the name assigned to the particular subaccount comprises a link to the document; and
 displaying the additional information describing the investment fund associated with the first subaccount of the set of subaccounts in a new page of a graphical user interface, wherein the table and the graphical illustration were displayed in a first page of the graphical user interface.

6. The apparatus of claim 1, wherein the hardware processor is further configured to display, on a fourth region of the display, information associated with a strategy associated with the account, the strategy comprising at least one of:
a rebalancing strategy, wherein:
 the information associated with the strategy comprises:
  a set of rebalancing allocations, wherein:
   a total value is held in the account; and
   each rebalancing allocation is assigned to one subaccount of the set of subaccounts, and indicates a percentage of the total value to be allocated to the subaccount upon a rebalancing of the account;
  a date at which the rebalancing of the account is next set to occur; and
  a frequency at which the rebalancing of the account is set to occur;
a dollar cost averaging strategy, wherein:
 the investment fund associated with a second subaccount of the set of subaccounts is a money market fund; and
 the information associated with the strategy comprises:
  a percentage of the value of the second subaccount to be transferred out of the second subaccount as a transfer amount upon a dollar cost averaging of the account;
  a set of transfer allocations, each transfer allocation of the set of transfer allocations assigned to a subaccount of the set of subaccounts, and indicating a percentage of the transfer amount to be allocated to the subaccount upon the dollar cost averaging of the account;
  a date at which the dollar cost averaging of the account is next set to occur; and
  a frequency at which the dollar cost averaging of the account is set to occur; and
a fee allocation strategy, wherein:
 the account is associated with one or more fees that are periodically assessed against the account; and
 the information associated with the fee allocation strategy comprises a set of fee allocations, each fee allocation being assigned to a subaccount of the set of subaccounts, and indicating a percentage of the one or more fees to be removed from the value of the subaccount upon assessment of the one or more fees upon the account.

7. The apparatus of claim 6, wherein the hardware processor is further configured to display on a fifth region of the display:
- a first portion of a list identifying available investment funds, wherein the available investment funds comprise at least the investment funds associated with the subaccounts of the set of subaccounts; and
- an interactive element comprising at least one of:
  - a scroll bar, wherein in response to a user interacting with the scroll bar, the hardware processor is further configured to replace the first portion of the list with a new portion of the list, the new portion of the list identifying one or more available investment funds not identified in the first portion of the list; and
  - a button, wherein in response to the user interacting with the button, the hardware processor is further configured to:
    - expand the fifth region of the display; and
    - expand the first portion of the list such that the first portion of the list corresponds to a complete copy of the list.

8. The apparatus of claim 1, wherein:
the table and the graphical illustration are displayed in a window on the display, the window comprising a scroll bar and configured to display a portion of a graphical user interface, the scroll bar operable to adjust the portion of the graphical user interface displayed in the window; and
the hardware processor is further configured to:
  - display a button in the window, the button located at a position in the window fixed relative to a corner of the window, the button selectable by the user to access one or more available forms;
  - determine that the user interacted with the scroll bar; and
  - in response to determining that the user interacted with the scroll bar:
    - adjust the portion of the graphical user interface displayed in the window, wherein:
      - the position of the button in the window relative to the corner of the window does not change during the adjustment; and
      - a position of the button on the graphical user interface changes during the adjustment.

9. A method comprising:
receiving a request to display information associated with an account, the account comprising a set of subaccounts, the information comprising:
  - a set of allocation amounts, each allocation amount being assigned to a subaccount of the set of subaccounts, and indicating a percentage of a premium payment allocated to the subaccount; and
  - a set of values, each value associated with a subaccount of the set of subaccounts, and indicating an amount invested in an investment fund associated with the subaccount;
displaying on a first region of a display a table comprising one or more rows, each row assigned to a subaccount of the set of subaccounts and comprising:
  - a name assigned to the subaccount;
  - the allocation amount assigned to the subaccount; and
  - the value of the subaccount;
displaying on a second region of the display a graphical illustration associated with the account, the graphical illustration comprising:
  - an interactive pie chart comprising:
    - an inner ring comprising a first set of segments, wherein each segment of the first set of segments corresponds to a subaccount of the set of subaccounts and defines an area on the display that is proportional to the allocation amount assigned to the corresponding subaccount;
    - an outer ring encompassing the inner ring and comprising a second set of segments, wherein each segment of the second set of segments corresponds to a subaccount of the set of subaccounts and defines an area on the display that is proportional to the value associated with the corresponding subaccount;
displaying on a third region of the display information determined to be of interest to a user of the account, wherein the information is linked to a corresponding webpage;
presenting the webpage on the display in response to receiving a selection of at least a subset of the information;
receiving a user interaction indicating a first subaccount of the set of subaccounts, wherein the user interaction indicating the first subaccount of the set of subaccounts comprises one of:
  - a user interaction with the row of the table assigned to the first subaccount;
  - a user interaction with the segment of the first set of segments that corresponds to the first subaccount; and
  - a user interaction with the segment of the second set of segments that corresponds to the first subaccount; and
in response to receiving the user interaction indicating the first subaccount of the set of subaccounts:
  - displaying information describing the investment fund associated with the first subaccount of the set of subaccounts in a pop-up window on the display;
  - emphasizing the row of the table assigned to the first subaccount;
  - highlighting the segment of the first set of segments that corresponds to the first subaccount by changing a color, position, or size of the segment of the first set of segments that corresponds to the first subaccount; and
  - highlighting the segment of the second set of segments that corresponds to the first subaccount by changing a color, position, or size of the segment of the second set of segments that corresponds to the first subaccount.

10. The method of claim 9, further comprising, in response to receiving the request to display the information, accessing a database storing historical performance information, the historical performance information comprising, for each investment fund associated with a subaccount of the set of subaccounts, an average return of the investment fund over a set period of time, wherein each row of the displayed table further comprises the average return of the investment fund associated with the subaccount of the set of subaccounts to which the row is assigned.

11. The method of claim 9, wherein:
emphasizing the row of the table assigned to the first subaccount comprises at least one of:
  adjusting a background color of the row;

increasing a size of the row; and
adjusting a property of text displayed within the row.

12. The method of claim 9, wherein the user interaction indicating the first subaccount comprises at least one of:
a user hovering a cursor over at least one of:
the row of the table assigned to the first subaccount;
the segment of the first set of segments corresponding to the first subaccount; and
the segment of the second set of segments corresponding to the first subaccount; or
the user clicking on at least one of:
the row of the table assigned to the first subaccount;
the segment of the first set of segments corresponding to the first subaccount; and
the segment of the second set of segments corresponding to the first subaccount.

13. The method of claim 9, further comprising displaying additional information describing the investment fund associated with the first subaccount of the set of subaccounts, including at least one of:
executing an application configured to display a document comprising the additional information describing the investment fund associated with the first subaccount of the set of subaccounts, wherein the name assigned to the particular subaccount comprises a link to the document; and
displaying the additional information describing the investment fund associated with the first subaccount of the set of subaccounts in a new page of a graphical user interface, wherein the table and the graphical illustration were displayed in a first page of the graphical user interface.

14. The method of claim 9, further comprising displaying on a fourth region of the display information associated with a strategy associated with the account, the strategy comprising at least one of:
a rebalancing strategy, wherein:
the information associated with the strategy comprises:
a set of rebalancing allocations, wherein:
a total value is held in the account; and
each rebalancing allocation is assigned to one subaccount of the set of subaccounts, and indicates a percentage of the total value to be allocated to the subaccount upon rebalancing of the account;
a date at which the rebalancing of the account is next set to occur; and
a frequency at which the rebalancing of the account is set to occur;
a dollar cost averaging strategy, wherein:
the investment fund associated with a second subaccount of the set of subaccounts is a money market fund; and
the information associated with the strategy comprises:
a percentage of the value of the second subaccount to be transferred out of the second subaccount as a transfer amount upon a dollar cost averaging of the account;
a set of transfer allocations, each transfer allocation of the set of transfer allocations assigned to a subaccount of the set of subaccounts, and indicating a percentage of the transfer amount to be allocated to the subaccount upon the dollar cost averaging of the account;
a date at which the dollar cost averaging of the account is next set to occur; and
a frequency at which the dollar cost averaging of the account is set to occur; and
a fee allocation strategy, wherein:
the account is associated with one or more fees that are periodically assessed against the account; and
the information associated with the fee allocation strategy comprises a set of fee allocations, each fee allocation being assigned to a subaccount of the set of subaccounts, and indicating a percentage of the one or more fees to be removed from the value of the subaccount upon assessment of the one or more fees upon the account.

15. The method of claim 14, further comprising displaying on a fifth region of the display:
a first portion of a list identifying available investment funds, wherein the available investment funds comprise at least the investment funds associated with the subaccounts of the set of subaccounts; and
an interactive element comprising at least one of:
a scroll bar, wherein in response to a user interacting with the scroll bar, the method further comprises replacing the first portion of the list with a new portion of the list, the new portion of the list identifying one or more available investment funds not identified in the first portion of the list; and
a button, wherein in response to the user interacting with the button, the method further comprises:
expanding the fifth region of the display; and
expanding the first portion of the list, such that the first portion of the list corresponds to a complete copy of the list.

16. The method of claim 9, wherein:
the table and the graphical illustration are displayed in a window on the display, the window comprising a scroll bar and configured to display a portion of a graphical user interface, the scroll bar operable to adjust the portion of the graphical user interface displayed in the window; and
the method further comprises:
displaying a button in the window, the button located at a position in the window fixed relative to a corner of the window, the button selectable by the user to access one or more available forms;
determining that the user interacted with the scroll bar; and
in response to determining that the user interacted with the scroll bar:
adjusting the portion of the graphical user interface displayed in the window, wherein:
the position of the button in the window relative to the corner of the window does not change during the adjustment; and
a position of the button on the graphical user interface changes during the adjustment.

* * * * *